United States Patent
Mansur et al.

(10) Patent No.: US 11,188,375 B2
(45) Date of Patent: Nov. 30, 2021

(54) VIRTUAL MACHINE MOBILITY FOR VIRTUAL MACHINES USING REMOTE DIRECT MEMORY ACCESS CONNECTIONS

(71) Applicant: International Business Machines Corporation, Armonk, NY (US)

(72) Inventors: Vishal Mansur, Bangalore (IN); Srinivas Gundurao, Bangalore (IN); Sivakumar Krishnasamy, Bangalore (IN); Jeffrey Messing, Round Rock, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 166 days.

(21) Appl. No.: 16/537,508

(22) Filed: Aug. 9, 2019

(65) Prior Publication Data
US 2021/0042139 A1 Feb. 11, 2021

(51) Int. Cl.
*G06F 9/455* (2018.01)

(52) U.S. Cl.
CPC .. *G06F 9/45558* (2013.01); *G06F 2009/4557* (2013.01); *G06F 2009/45583* (2013.01); *G06F 2009/45595* (2013.01)

(58) Field of Classification Search
CPC ......... G06F 9/45558; G06F 2009/4557; G06F 2009/45583; G06F 2009/45595
See application file for complete search history.

(56) References Cited

U.S. PATENT DOCUMENTS

| | | | |
|---|---|---|---|
| 8,023,520 B2 * | 9/2011 | Barron | H04L 69/161 370/410 |
| 9,417,996 B2 | 8/2016 | Fitzpatrick et al. | |
| 9,529,623 B2 * | 12/2016 | Gu | G06F 9/45558 |
| 9,882,776 B2 * | 1/2018 | Aybay | H04L 47/12 |
| 9,954,979 B2 | 4/2018 | Herr et al. | |
| 2006/0206904 A1 * | 9/2006 | Watkins | G06F 9/45537 719/321 |
| 2013/0332678 A1 | 12/2013 | Fitzpatrick et al. | |
| 2017/0085683 A1 | 3/2017 | Herr et al. | |

(Continued)

OTHER PUBLICATIONS

Huang et al., *High Performance Virtual Machine Migration with RDMA over Modern Interconnects*, 2007 IEEE International Conference on Cluster Computing, Sep. 17-20, 2007, Austin, TX, USA, 10 pages.

(Continued)

*Primary Examiner* — Jacob D Dascomb
(74) *Attorney, Agent, or Firm* — Teddi Maranzano

(57) ABSTRACT

Virtual machine mobility for virtual machine using remote direct memory access (RDMA) connections, including: receiving a virtual machine (VM) mobility request to transfer a virtual machine from a source host to a destination host; migrating application data transfer from an RDMA connection of the virtual machine to a Transmission Control Protocol (TCP) connection of the virtual machine, wherein the RDMA connection and the TCP connection are facilitated by a physical network adapter; migrating the TCP connection to a virtual network adapter of the virtual machine; and transferring the virtual machine from the source host to the destination host.

20 Claims, 7 Drawing Sheets

(56) References Cited

U.S. PATENT DOCUMENTS

2018/0103125 A1 4/2018 Ellison et al.
2020/0218684 A1* 7/2020 Sen .................. G06F 3/0647

OTHER PUBLICATIONS

Ranadive et al., *Toward a Paravirtual vRDMA Device for VMware ESXi Guests*, VMware Technical Journal, vol. 1, No. 2, Dec. 2012, pp. 22-27.
Fan et al., *Towards a Lightweight RDMA Para-Virtualization for HPC*, COSH-VisorHPC 2017, Jan. 24, 2017, Stockholm, Sweden, ISBN 978-3-00-055564-0, DOI: 10.14459/2017md1344417, 6 pages.
Ranadive et al., *VMWare Paravirtual RDMA, Developer Perspective*, OpenFabrics Alliance $13^{th}$ Annual Workshop 2017, VMWare, Mar. 28, 2017, 16 pages.

\* cited by examiner

VIRTUAL MACHINE MOBILITY FOR VIRTUAL MACHINES USING REMOTE DIRECT MEMORY ACCESS CONNECTIONS

BACKGROUND

Field of the Invention

The field of the invention is data processing, or, more specifically, methods, apparatus, and products for virtual machine mobility for virtual machines using remote direct memory access (RDMA) connections.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

SUMMARY

Virtual machine mobility for virtual machines using remote direct memory access (RDMA) connections, including: receiving a virtual machine (VM) mobility request to transfer a virtual machine from a source host to a destination host; migrating application data transfer from an RDMA connection of the virtual machine to a Transmission Control Protocol (TCP) connection of the virtual machine, wherein the RDMA connection and the TCP connection are facilitated by a physical network adapter; migrating the TCP connection to a virtual network adapter of the virtual machine; and transferring the virtual machine from the source host to the destination host.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
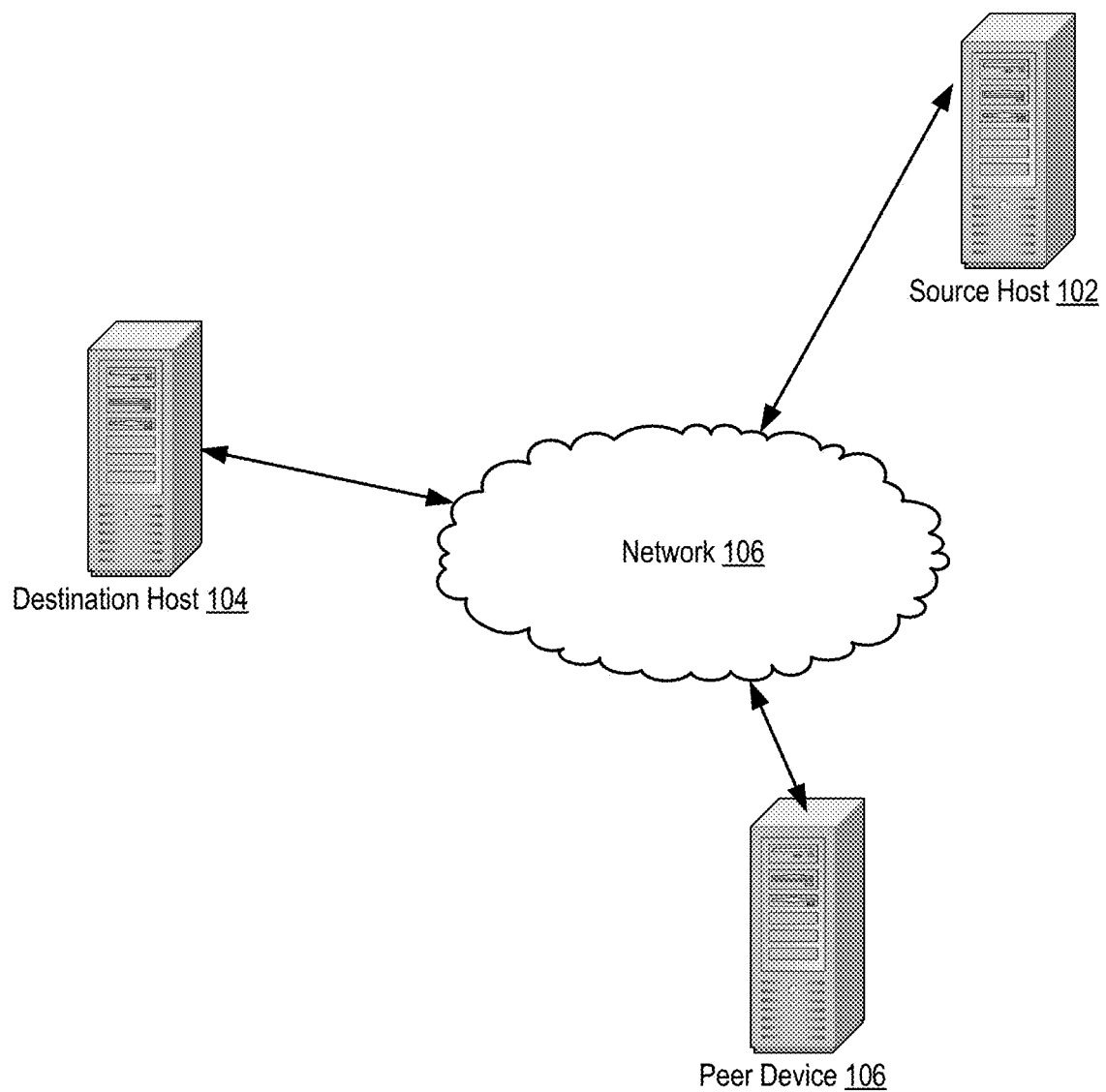
FIG. 1 is a network diagram of an example system for virtual machine mobility for virtual machines using remote direct memory access (RDMA) connections according to embodiments of the present disclosure.

Exemplary methods, apparatus, and products for virtual machine mobility for virtual machines using remote direct memory access (RDMA) connections in accordance with the present invention are described with reference to the accompanying drawings, beginning with FIG. 1. FIG. 1 sets forth a network diagram of a system configured for virtual machine mobility for virtual machines using remote direct memory access (RDMA) connections according to embodiments of the present invention. The system of FIG. 1 includes a source host 102 and a destination host 104 in communication via a network 106. One or more peer devices 108 may also be in communication with the source host 102 and a destination host 104. Peer devices 108 may also comprise servers or other computing devices.

The source host 102 and destination host 104 are computing devices (e.g., servers) configured to execute and maintain virtual machines of a cloud computing environment. Cloud computing allows for on-demand self-service and scalability for virtual machines. Where the system requirements of a virtual machine exceed the capacity of the server on which the virtual machine is deployed (e.g., the source host 102), virtual machine mobility allows for the virtual machine to be migrated to another server with more available resources (e.g., the destination host 104).

Remote Direct Memory Access (RDMA) allows for the transfer of data between computing devices on the same network (e.g., a source host 102 and peer device 108) by allowing a network adapter to directly write to or read from application memory, eliminating the need to write this application data to a buffer of the operating system. This allows for high-speed, low-latency data transfers between computing devices on the same network. However, RDMA traditionally does not support VM mobility.

A Shared Memory Communications over RDMA (SMC-R) layer allows for socket-based applications to use RDMA without changing the underlying application. While transferring application data using the RDMA connection, SMC-R also maintains a Transmission Control Protocol (TCP) connection using TCP keepalives. Using the SMC-R framework, virtual machine mobility may be implemented for virtual machine using RDMA connections.

The source host 102 may execute a virtual machine maintaining one or more RDMA connections (e.g., with a peer device 108). The source host 102 may transfer application data to and from the peer device 108 via the RDMA connection. As an example, the RDMA connection may be facilitated by an SCM-R layer. The source host 102 may receive a virtual machine mobility request to transfer the virtual machine from the source host 102 to the destination host 104. For example, a hypervisor monitoring the virtual machines of the cloud computing environment may generate the virtual machine mobility request. The hypervisor may comprise a process executed in the source host 102 or the destination host 104, or executed in another computing device.

In response to the request, the source host 102 may migrate application data transfer from the RDMA connection of the virtual machine to a TCP connection of the virtual machine, wherein the RDMA connection and the TCP connection are facilitated by a physical network adapter (e.g., of the source host 102). Migrating application data transfer from the RDMA connection of the virtual machine to the TCP connection of the virtual machine causes application data transfer to occur via the TCP connection instead of the RDMA connection. For example, assume that an SMC-R layer facilitating RDMA connections of the virtual machine also facilitates TCP connections, such that each RDMA connection has a corresponding TCP connection. Each TCP connection connects the source host 102 to the peer device 108 connected via the corresponding RDMA connection. As application data is transferred using the RDMA connections, the TCP connections are maintained using TCP keepalives.

Migrating application data transfer from the RDMA connection of the virtual machine to the TCP connection of the virtual machine may comprise blocking writes to the RDMA connection. For example, a message may be sent to each peer device 108 communicating with the source host 102 via the RDMA connection to block writes to the RDMA connection. Thus, no additional application data is queued for transfer between the source host 102 and the peer device 108.

Migrating application data transfer from the RDMA connection of the virtual machine to the TCP connection of the virtual machine may also comprise moving one or more buffers of a send queue of the RDMA connection to a send queue (e.g., a send buffer) of the TCP connection. The send queue of the RDMA connection stores data written to the RDMA connection for transfer that has not yet been sent to the corresponding peer device 108. Accordingly, the one or more buffers of the send queue of the RDMA connection may be moved to the send queue of the TCP connection to allow later transfer via the TCP connection.

Migrating application data transfer from the RDMA connection of the virtual machine to the TCP connection of the virtual machine may also comprise copying any unread data in a Remote Memory Buffer Element of the RDMA connection to the receive side of the socket. Thus, the unread data may be subsequently processed from the socket following the termination of the RDMA connection.

Migrating application data transfer from the RDMA connection of the virtual machine to the TCP connection of the virtual machine may also comprise removing the RDMA connection. Removing the RDMA connection may comprise closing the connection, freeing any allocated resources associated with the connection (e.g., queue pairs, memory, etc.), or otherwise breaking down the RDMA connection.

After migrating application data transfer from the RDMA connection of the virtual machine to the TCP connection of the virtual machine, the source host may migrate the TCP connection to a virtual network adapter of the virtual machine. Migrating the TCP connection to the virtual network adapter causes the TCP connection to be handled via the virtual network adapter instead of the physical network adapter. The virtual network adapter may be generated by the source host 102 in response to receiving the virtual machine mobility request. The virtual network adapter may be configured to serve as a secondary network adapter to the primary physical network adapter.

Migrating the TCP connection to the virtual network adapter of the virtual machine may comprise removing the physical network adapter from the virtual machine. Removing the physical network adapter from the virtual machine may comprise disassociating the physical network adapter from the virtual machine. For example, Dynamic Logical Partitioning may be used to reconfigure the virtual machine to disassociate the physical network adapter from the virtual machine. Removing the physical network adapter from the virtual machine may cause the TCP connection to fail over to the virtual network adapter, thereby migrating the TCP connection to the virtual network adapter.

Although the discussion set forth above with respect to migrating application data transfer from an RDMA connection of the virtual machine to a Transmission Control Protocol (TCP) connection of the virtual machine and migrating the TCP connection to a virtual network adapter is discussed with respect to one RDMA connection, it is understood that the source host 102 may use multiple RDMA connections concurrently. Accordingly, application data transfer may be migrated from each of the RDMA connections to corresponding TCP connections. Each of these TCP connections may then be migrated to the virtual network adapter.

The source host 102 may then migrate the virtual machine from the source host 102 to the destination host 104. Migrating the virtual machine from the source host 102 to the destination host 104 causes the virtual machine to be executed on the destination host 104. The destination host 104 may then resume application data transfer to the one or more peer devices 108 using the TCP connections of the virtual machine.

The destination host 104 may migrate application data transfer from the TCP connection to another RDMA connection. Where multiple TCP connections are active in the virtual machine, multiple RDMA connections may be created. Each of the TCP connections may then be migrated to a corresponding RDMA connection. Migrating application data transfer from the TCP connection to another RDMA connection may comprise sending a request to a corresponding peer device 108 to migrate application data transfer to an RDMA connection using SMC-R. The receiving peer device 108 may then send a positive or negative acknowledgement. Where the peer device 108 agrees to migrate, both the destination host 104 and peer device 108 may refrain from sending any additional application data over the TCP connection. The destination host 104 and peer device 108 may also wait for acknowledgements (e.g., ACKs) for all unacknowledged data. The destination host 104 may then create a new RDMA connection. Unread data from the receive queue of the TCP connection may be moved to an RMBE of the new RDMA connection. The data in the send queue of the TCP connection may be moved to the send queue of the new RDMA connection. Application data transfer may then resume via the new RDMA connection.

The destination host 104 may also continue to use the TCP connection for application data transfer instead of an RDMA connection. For example, where a peer device 108 declines a request to migrate the application data transfer to RDMA, the destination host 104 may continue to use the TCP connection. As another example, where the destination host 104 lacks sufficient resources to create a new RDMA connection, the destination host 104 may instead use the TCP connection.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Virtual machine mobility for virtual machine using remote direct memory access (RDMA) connections in accordance with the present invention is generally implemented with computers, that is, with automated computing machinery. For further explanation, therefore, FIG. 2 sets forth a block diagram of automated computing machinery comprising an exemplary computer 102 configured for [PREAMBLE] according to embodiments of the present invention. For example, the source host 102, destination host 104 may be implemented with the exemplary computer 102. The computer 102 of FIG. 2 includes at least one computer processor 202 or 'CPU' as well as random access memory 204 (RAM') which is connected through a high speed memory bus 206 and bus adapter 208 to processor 202 and to other components of the computer 102.

Figure 2:
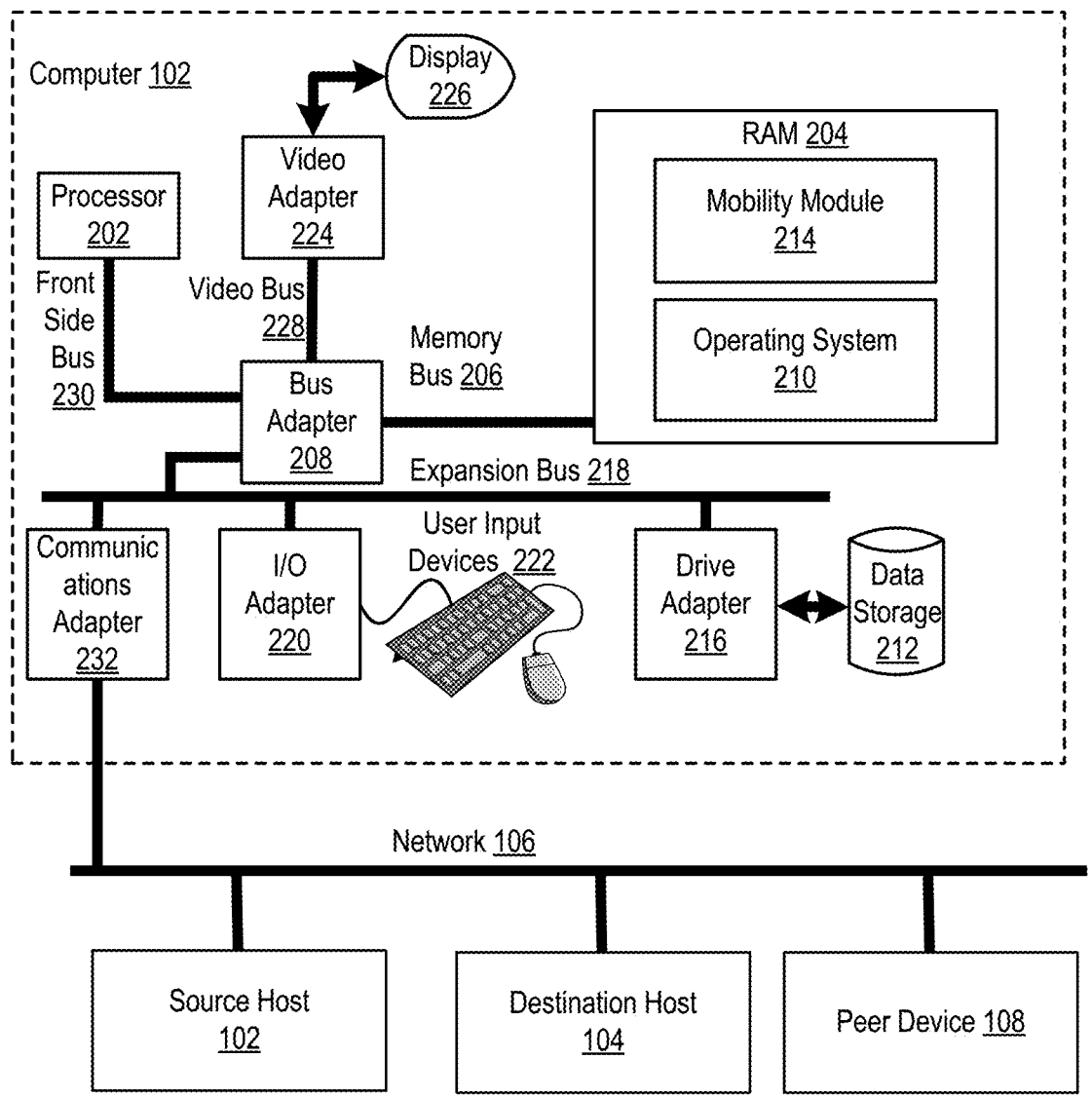
FIG. 2 is a block diagram of an example computing device for virtual machine mobility for virtual machines using remote direct memory access (RDMA) connections according to embodiments of the present disclosure.

Stored in RAM 204 is an operating system 210. Operating systems useful in computers configured for virtual machine mobility for virtual machine using remote direct memory access according to embodiments of the present invention include UNIX™, Linux™, Microsoft Windows™, AIX™, IBM's i OS™, and others as will occur to those of skill in the art. The operating system 208 in the example of FIG. 2 is shown in RAM 204, but many components of such software typically are stored in non-volatile memory also, such as, for example, on data storage 212, such as a disk drive. Also stored in RAM is the mobility module 214, a module for virtual machine mobility for virtual machine using remote direct memory access according to embodiments of the present invention.

The computer 102 of FIG. 2 includes disk drive adapter 216 coupled through expansion bus 218 and bus adapter 208 to processor 202 and other components of the computer 102. Disk drive adapter 216 connects non-volatile data storage to the computer 102 in the form of data storage 212. Disk drive adapters useful in computers configured for virtual machine mobility for virtual machine using remote direct memory access according to embodiments of the present invention include Integrated Drive Electronics ('IDE') adapters, Small Computer System Interface (SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer 102 of FIG. 2 includes one or more input/output ('I/O') adapters 220. I/O adapters implement user-oriented input/output through, for example, software drivers and computer hardware for controlling output to display devices such as computer display screens, as well as user input from user input devices 222 such as keyboards and mice. The example computer 102 of FIG. 2 includes a video adapter 224, which is an example of an I/O adapter specially designed for graphic output to a display device 226 such as a display screen or computer monitor. Video adapter 224 is connected to processor 202 through a high speed video bus 228, bus adapter 208, and the front side bus 230, which is also a high speed bus.

The exemplary computer 102 of FIG. 2 includes a communications adapter 232 for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for virtual machine mobility for virtual machine using remote direct memory access according to embodiments of the present invention include modems for wired dial-up communications, Ethernet (IEEE 802.3) adapters for wired data communications, and 802.11 adapters for wireless data communications.

The communications adapter 232 is communicatively coupled to a network 106 that may include a source host 102, a destination host 104 and/or one or more peer devices.

Figure 3:
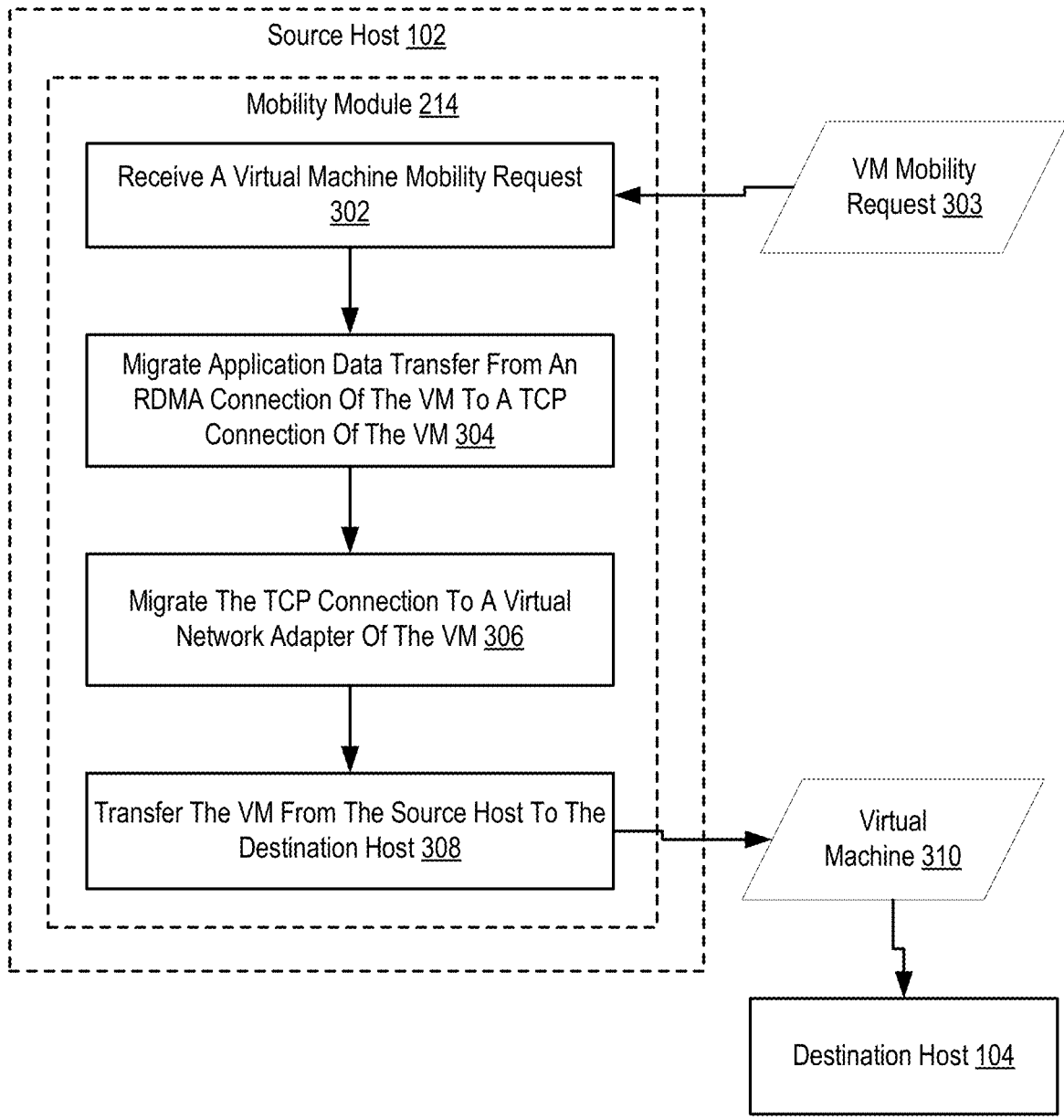
FIG. 3 is a flowchart of an example method for virtual machine mobility for virtual machines using remote direct memory access (RDMA) connections according to embodiments of the present disclosure.

For further explanation, FIG. 3 sets forth a flow chart illustrating an exemplary method for virtual machine mobility for virtual machine using remote direct memory access according to embodiments of the present invention that includes receiving 302 (e.g., by a mobility module 214 of a source host 102), a virtual machine mobility request 303 to transfer the virtual machine 310 from the source host 102 to the destination host 104. For example, a hypervisor monitoring the virtual machines of the cloud computing environment may generate the virtual machine mobility request 303. The hypervisor may comprise a process executed in the source host 102 or the destination host 104, or executed in another computing device.

The method of FIG. 3 also includes migrating 304 (e.g., by the mobility module 214 of the source host 102) application data transfer from the RDMA connection of the virtual machine 310 to a TCP connection of the virtual machine 310, wherein the RDMA connection and the TCP connection are facilitated by a physical network adapter (e.g., of the source host 102). Migrating 304 application data transfer from the RDMA connection of the virtual machine 310 to the TCP connection of the virtual machine 310 causes application data transfer to occur via the TCP connection instead of the RDMA connection. For example, assume that an SMC-R layer facilitating RDMA connections of the virtual machine 310 also facilitates TCP connections, such that each RDMA connection has a corresponding TCP connection. Each TCP connection connects the source host 102 to the peer device 108 connected via the corresponding RDMA connection. As application data is transferred using the RDMA connections, the TCP connections are maintained using TCP keepalives.

The method of FIG. 3 also includes migrating 306 (e.g., by the mobility module 214 of the source host 102) the TCP connection to a virtual network adapter of the virtual machine 310. Migrating 306 the TCP connection to the virtual network adapter causes the TCP connection to be handled via the virtual network adapter instead of the physical network adapter.

Although the discussion set forth above with respect to migrating application data transfer from an RDMA connection of the virtual machine to a Transmission Control Protocol (TCP) connection of the virtual machine 310 and migrating the TCP connection to a virtual network adapter is discussed with respect to one RDMA connection, it is understood that the source host 102 may use multiple RDMA connections concurrently. Accordingly, application data transfer may be migrated from each of the RDMA connections to corresponding TCP connections. Each of these TCP connections may then be migrated to the virtual network adapter.

Method of FIG. 3 also comprises transferring 308 (e.g., by the mobility module 214 of the source host 102) the virtual machine 310 from the source host 102 to the destination host 104. Transferring the virtual machine from the source host 102 to the destination host 104 causes the virtual machine to be executed on the destination host 104. The destination host 104 may then resume application data transfer to the one or more peer devices 108 using the TCP connections of the virtual machine 310. Transferring the virtual machine may be facilitated by a hypervisor or other service. For example, resources may be allocated on the destination host 104 for the virtual machine by the hypervisor. Data may be transferred (e.g., machine images, etc.) to the destination host 104 by the hypervisor, or directly from the source host 102.

Figure 4:
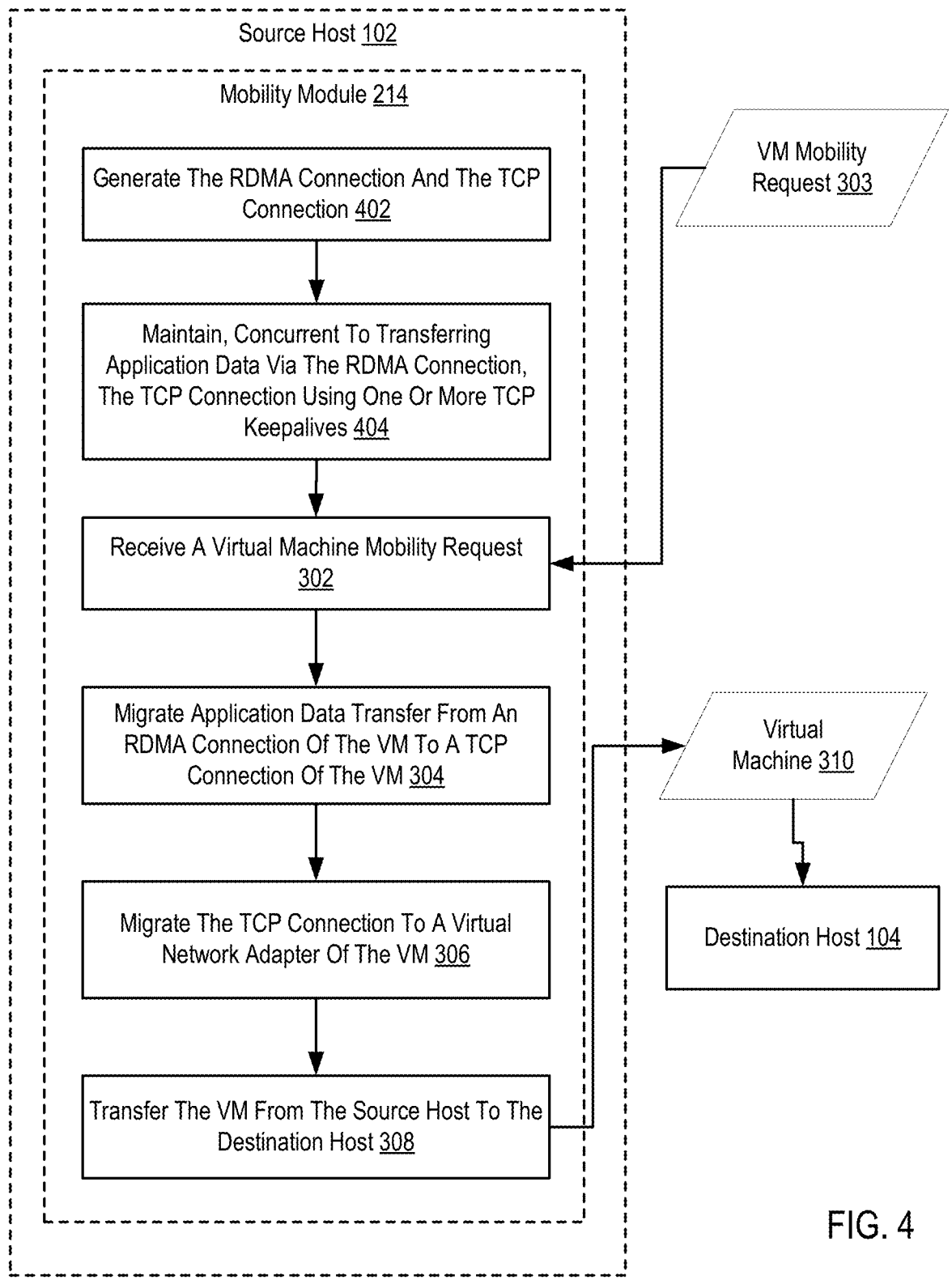
FIG. 4 is a flowchart of an example method for virtual machine mobility for virtual machines using remote direct memory access (RDMA) connections according to embodiments of the present disclosure.

For further explanation, FIG. 4 sets forth a flow chart illustrating an exemplary method for virtual machine mobility for virtual machine using remote direct memory access according to embodiments of the present invention that includes receiving 302 (e.g., by a mobility module 214 of a source host 102), a virtual machine mobility request 303 to transfer the virtual machine 310 from the source host 102 to the destination host 104; migrating 304 application data transfer from an RDMA connection of the virtual machine 310 to a TCP connection of the virtual machine 310, migrating the TCP connection to a virtual network adapter of the virtual machine 310; and transferring 308 the virtual machine 310 from the source host 102 to the destination host 104.

The method of FIG. 4 differs from FIG. 3 in that the method of FIG. 4 also includes generating 402 (e.g., by the mobility module 214 of the source host 102) the RDMA connection and the TCP connection. The RDMA connection and the TCP connection may be facilitated by an SMC-R layer. The RDMA connection and the TCP connection may serve to connect the source host 102 (e.g., the virtual machine 310) to a same peer device 108.

The method of FIG. 4 further differs from FIG. 3 in that the method of FIG. 4 also includes maintaining 404, concurrent to transferring application data via the RDMA connection, the TCP connection using one or more TCP keepalives. For example, application data may be transferred using the RDMA connection. As application data is not transferred using the TCP connection, the TCP connection would normally be disconnected. Thus, TCP keepalive messages are used to ensure that the TCP connection remains in place and may later be used for virtual machine mobility.

Figure 5:
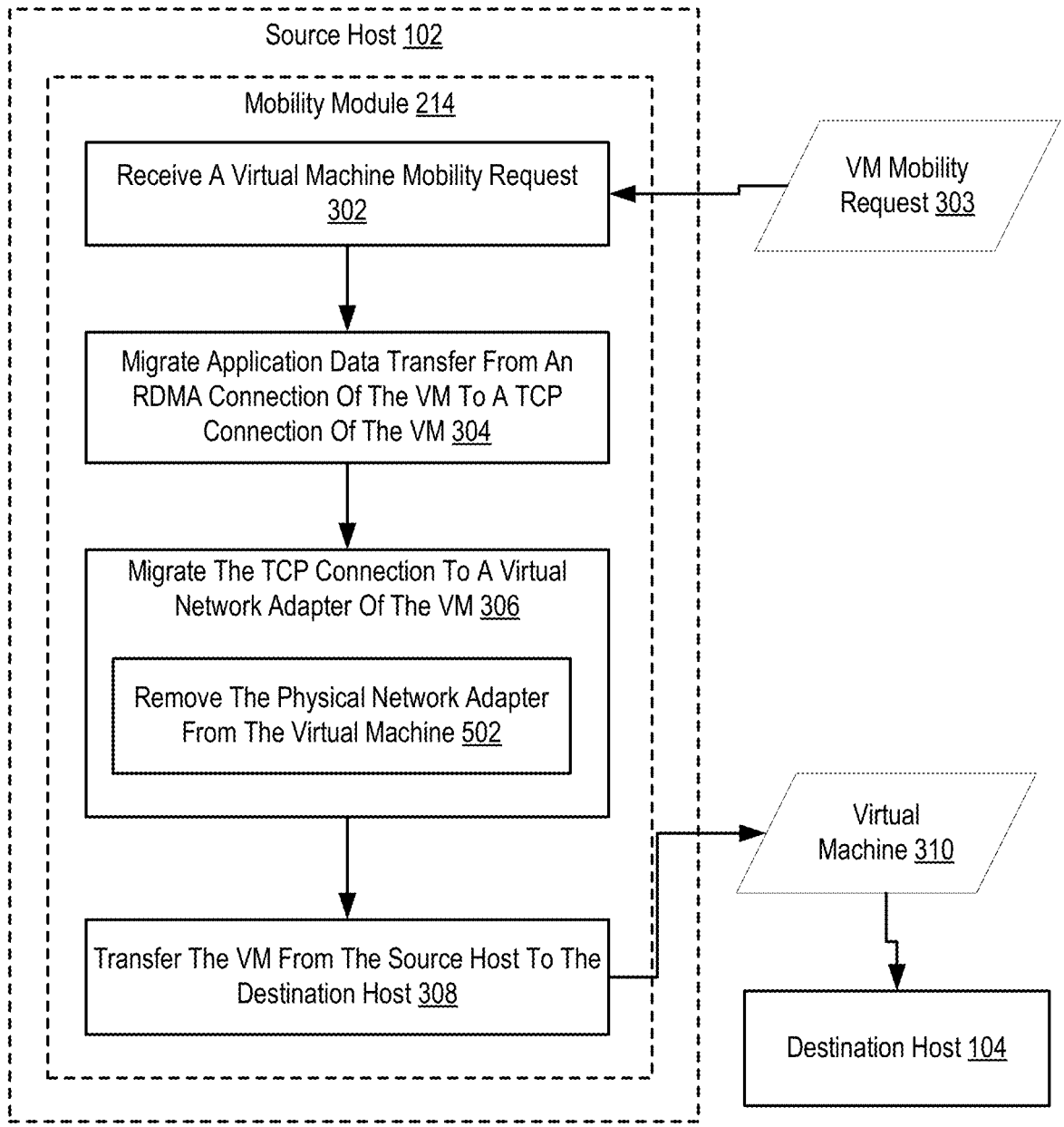
FIG. 5 is a flowchart of an example method for virtual machine mobility for virtual machines using remote direct memory access (RDMA) connections according to embodiments of the present disclosure.

For further explanation, FIG. 5 sets forth a flow chart illustrating an exemplary method for virtual machine mobility for virtual machine using remote direct memory access according to embodiments of the present invention that includes receiving 302 (e.g., by a mobility module 214 of a source host 102), a virtual machine mobility request 303 to transfer the virtual machine 310 from the source host 102 to the destination host 104; migrating 304 application data transfer from an RDMA connection of the virtual machine 310 to a TCP connection of the virtual machine 310, migrating the TCP connection to a virtual network adapter of the virtual machine 310; and transferring 308 the virtual machine 310 from the source host 102 to the destination host 104.

The method of FIG. 5 differs from FIG. 3 in that migrating the TCP connection to a virtual network adapter of the virtual machine 310 comprises removing 502 the physical network adapter from the virtual machine 310. Removing 502 the physical network adapter from the virtual machine 310 may comprise disassociating the physical network adapter from the virtual machine 310. For example, Dynamic Logical Partitioning may be used to reconfigure the virtual machine 310 to disassociate the physical network adapter from the virtual machine 310. Removing 502 the physical network adapter from the virtual machine 310 may cause the TCP connection to fail over to the virtual network adapter, thereby migrating the TCP connection to the virtual network adapter.

Figure 6:
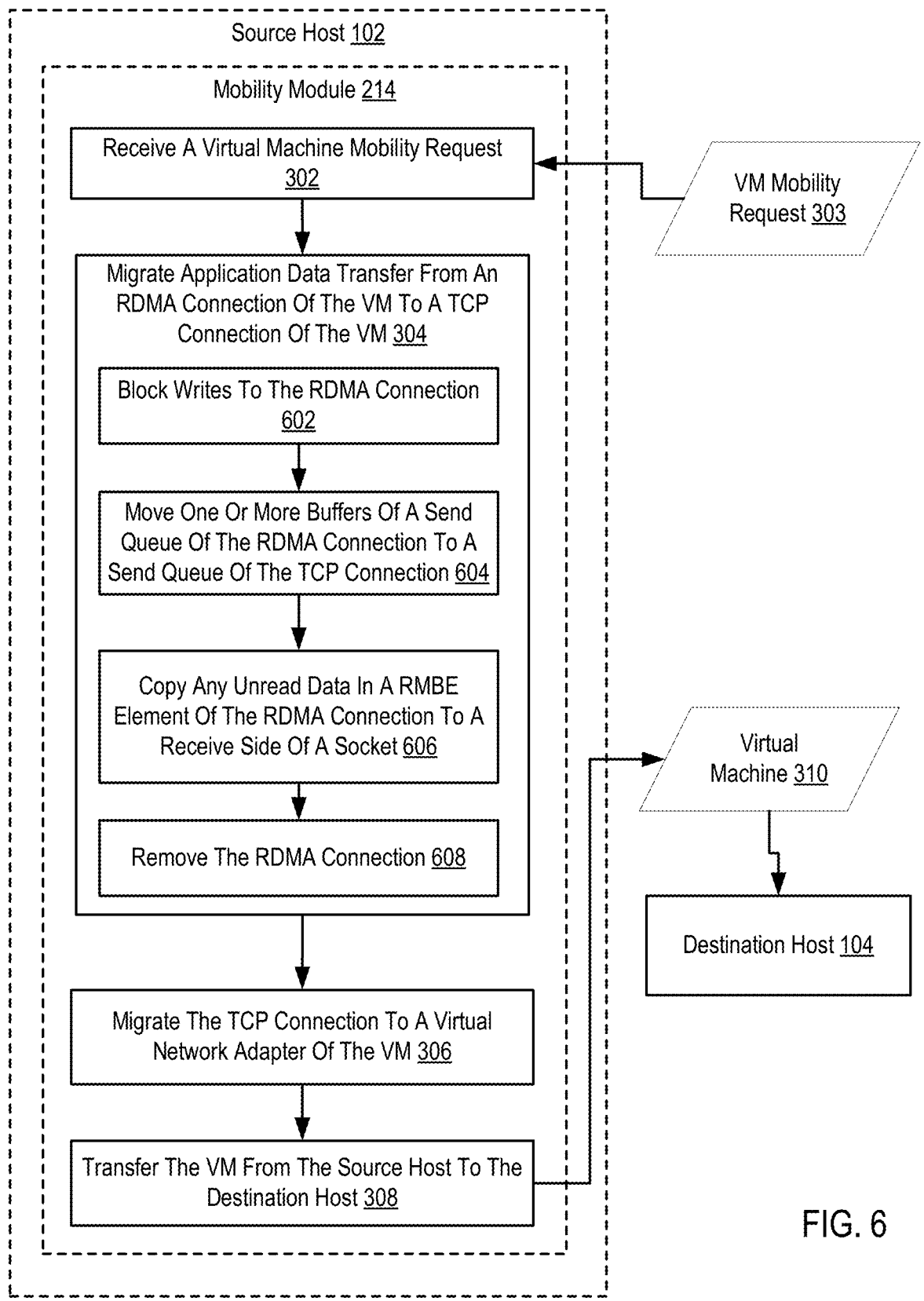
FIG. 6 is a flowchart of an example method for virtual machine mobility for virtual machines using remote direct memory access (RDMA) connections according to embodiments of the present disclosure.

For further explanation, FIG. 6 sets forth a flow chart illustrating an exemplary method for virtual machine mobility for virtual machine using remote direct memory access according to embodiments of the present invention that includes receiving 302 (e.g., by a mobility module 214 of a source host 102), a virtual machine mobility request 303 to transfer the virtual machine 310 from the source host 102 to the destination host 104; migrating 304 application data transfer from an RDMA connection of the virtual machine 310 to a TCP connection of the virtual machine 310, migrating the TCP connection to a virtual network adapter of the virtual machine 310; and transferring 308 the virtual machine 310 from the source host 102 to the destination host 104.

The method of FIG. 6 differs from FIG. 3 in that migrating 304 application data transfer from the RDMA connection of the virtual machine to the TCP connection of the virtual machine 310 also includes blocking (e.g., by the mobility module 214 of the source host 102) writes to the RDMA connection. For example, a message may be sent to each peer device 108 communicating with the source host 102 via the RDMA connection to block writes to the RDMA connection. Thus, no additional application data is queued for transfer between the source host 102 and the peer device 108.

The method of FIG. 6 differs from FIG. 3 in that migrating 304 application data transfer from the RDMA connection of the virtual machine to the TCP connection of the virtual machine 310 also includes moving 604 one or more buffers of a send queue of the RDMA connection to a send queue (e.g., a send buffer) of the TCP connection. The send queue of the RDMA connection stores data written to the RDMA connection for transfer that has not yet been sent to the corresponding peer device 108. Accordingly, the one or more buffers of the send queue of the RDMA connection may be moved to the send queue of the TCP connection to allow later transfer via the TCP connection.

The method of FIG. 6 differs from FIG. 3 in that migrating 304 application data transfer from the RDMA connection of the virtual machine to the TCP connection of the virtual machine 310 also includes copying 606 any unread data in a Remote Memory Buffer Element of the RDMA connection to a receive side of a socket. Thus, the unread data may be subsequently processed from the socket following the termination of the RDMA connection.

The method of FIG. 6 differs from FIG. 3 in that migrating 304 application data transfer from the RDMA connection of the virtual machine to the TCP connection of the virtual machine 310 also includes removing 608 the RDMA connection. Removing the RDMA connection may comprise closing the connection, freeing any allocated resources associated with the connection (e.g., queue pairs, memory, etc.), or otherwise breaking down the RDMA connection.

Figure 7:
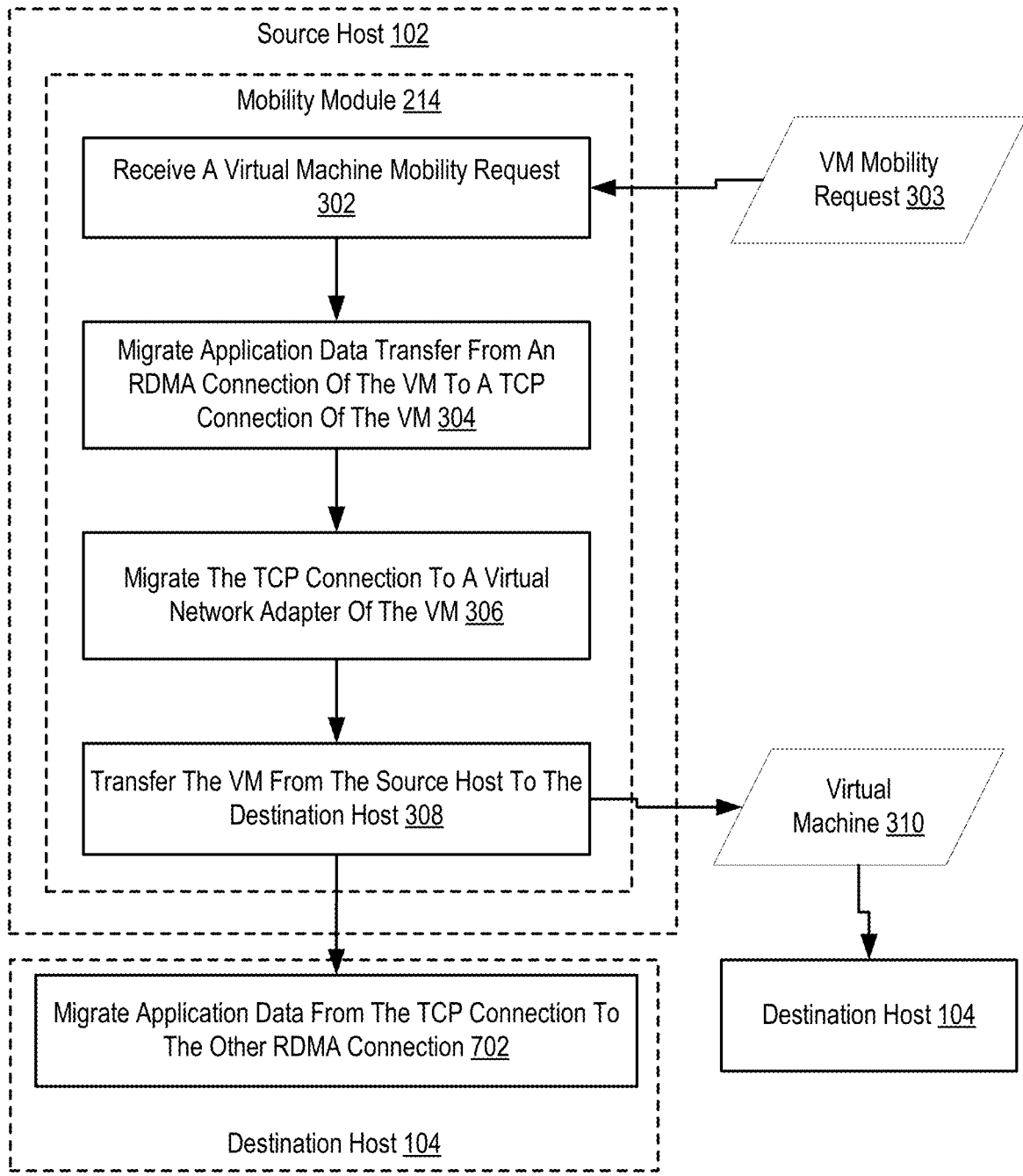
FIG. 7 is a flowchart of an example method for virtual machine mobility for virtual machines using remote direct memory access (RDMA) connections according to embodiments of the present disclosure.

For further explanation, FIG. 7 sets forth a flow chart illustrating an exemplary method for virtual machine mobility for virtual machine using remote direct memory access according to embodiments of the present invention that includes receiving 302 (e.g., by a mobility module 214 of a source host 102), a virtual machine mobility request 303 to transfer the virtual machine 310 from the source host 102 to the destination host 104; migrating 304 application data transfer from an RDMA connection of the virtual machine 310 to a TCP connection of the virtual machine 310, migrating the TCP connection to a virtual network adapter of the virtual machine 310; and transferring 308 the virtual machine 310 from the source host 102 to the destination host 104.

The method of FIG. 7 differs from FIG. 3 in that the method of FIG. 7 also includes migrating 702 (e.g., by the destination host 104) application data transfer from the TCP connection to another RDMA connection. Where multiple TCP connections are active in the virtual machine 310, multiple RDMA connections may be created. Each of the TCP connections may then be migrated to a corresponding RDMA connection. Migrating application data transfer from the TCP connection to another RDMA connection may comprise sending a request to a corresponding peer device 108 to migrate application data transfer to an RDMA connection using SMC-R. The receiving peer device 108 may then send a positive or negative acknowledgement. Where the peer device 108 agrees to migrate, both the destination host 104 and peer device 108 may refrain from sending any additional application data over the TCP connection. The destination host 104 and peer device 108 may also wait for acknowledgements (e.g., ACKs) for all unacknowledged data. The destination host 104 may then create a new RDMA connection. Unread data from the receive queue of the TCP connection may be moved to an RMBE of the new RDMA connection. The data in the send queue of the TCP connection may be moved to the send queue of the new RDMA connection. Application data transfer may then resume via the new RDMA connection.

In view of the explanations set forth above, readers will recognize that the benefits of virtual machine mobility for virtual machine using remote direct memory access (RDMA) connections according to embodiments of the present invention include:

Improved performance of a computing system as virtual machines using RDMA connections may be migrated between hosts without downtime or disruption in service.

Exemplary embodiments of the present invention are described largely in the context of a fully functional computer system for virtual machine mobility for virtual machine using remote direct memory access (RDMA) connections. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of virtual machine mobility for virtual machines using remote direct memory access (RDMA) connections, the method comprising:
   receiving a virtual machine (VM) mobility request to transfer a virtual machine from a source host to a destination host;
   migrating application data transfer from an RDMA connection of the virtual machine to a Transmission Control Protocol (TCP) connection of the virtual machine, including removing the RDMA connection after blocking writes to the RDMA connection, wherein the RDMA connection and the TCP connection are facilitated by a physical network adapter;
   migrating the TCP connection from the physical network adapter to a virtual network adapter of the virtual machine; and
   transferring the virtual machine from the source host to the destination host.

2. The method of claim 1, wherein the RDMA connection and the TCP connection are facilitated by a Shared Memory Communications over RDMA (SMC-R) layer.

3. The method of claim 1, further comprising generating, in response to the VM mobility request, the virtual network adapter for the virtual machine.

4. The method of claim 1, further comprising:
   generating the RDMA connection and the TCP connection; and
   maintaining, concurrent to transferring application data via the RDMA connection, the TCP connection using one or more TCP keepalives.

5. The method of claim 1, wherein migrating the TCP connection to the virtual network adapter of the virtual machine comprising removing the physical network adapter from the virtual machine.

6. The method of claim 1, wherein migrating application data transfer from the RDMA connection of the virtual machine to the TCP connection of the virtual machine comprises:
   blocking writes to the RDMA connection;
   moving one or more buffers of a send queue of the RDMA connection to a send queue of the TCP connection;
   copying any unread data in a Remote Memory Buffer Element of the RDMA connection to a receive side of a socket; and
   removing the RDMA connection.

7. The method of claim 1, further comprising:
   creating, in the virtual machine in the destination host, another RDMA connection; and
   migrating application data transfer from the TCP connection to the other RDMA connection.

8. An apparatus for virtual machine mobility for virtual machines using remote direct memory access (RDMA) connections, the apparatus comprising a computer processor, a computer memory operatively coupled to the computer processor, the computer memory having disposed within it computer program instructions that, when executed by the computer processor, cause the apparatus to carry out the steps of:
- receiving a virtual machine (VM) mobility request to transfer a virtual machine from a source host to a destination host;
- migrating application data transfer from an RDMA connection of the virtual machine to a Transmission Control Protocol (TCP) connection of the virtual machine, including removing the RDMA connection after blocking writes to the RDMA connection, wherein the RDMA connection and the TCP connection are facilitated by a physical network adapter, wherein migrating application data transfer from the RDMA connection of the virtual machine to the TCP connection of the virtual machine comprises moving one or more buffers of a send queue of the RDMA connection to a send queue of the TCP connection;
- migrating the TCP connection from the physical network adapter to a virtual network adapter of the virtual machine; and
- transferring the virtual machine from the source host to the destination host.

9. The apparatus of claim 8, wherein the RDMA connection and the TCP connection are facilitated by a Shared Memory Communications over RDMA (SMC-R) layer.

10. The apparatus of claim 8, wherein the steps further comprise generating, in response to the VM mobility request, the virtual network adapter for the virtual machine.

11. The apparatus of claim 8, wherein the steps further comprise:
- generating the RDMA connection and the TCP connection; and
- maintaining, concurrent to transferring application data via the RDMA connection, the TCP connection using one or more TCP keepalives.

12. The apparatus of claim 8, wherein migrating the TCP connection to the virtual network adapter of the virtual machine comprising removing the physical network adapter from the virtual machine.

13. The apparatus of claim 8, wherein migrating application data transfer from the RDMA connection of the virtual machine to the TCP connection of the virtual machine comprises:
- blocking writes to the RDMA connection;
- moving one or more buffers of a send queue of the RDMA connection to a send queue of the TCP connection;
- copying any unread data in a Remote Memory Buffer Element of the RDMA connection to a receive side of a socket; and
- removing the RDMA connection.

14. The apparatus of claim 8, wherein the steps further comprise:
- creating, in the virtual machine in the destination host, another RDMA connection; and
- migrating application data transfer from the TCP connection to the other RDMA connection.

15. A computer program product for virtual machine mobility for virtual machines using remote direct memory access (RDMA) connections, the computer program product disposed upon a computer readable medium, the computer program product comprising computer program instructions that, when executed, cause a computer to carry out the steps of:
- receiving a virtual machine (VM) mobility request to transfer a virtual machine from a source host to a destination host;
- migrating application data transfer from an RDMA connection of the virtual machine to a Transmission Control Protocol (TCP) connection of the virtual machine, including removing the RDMA connection after blocking writes to the RDMA connection, wherein the RDMA connection and the TCP connection are facilitated by a physical network adapter, wherein migrating application data transfer from the RDMA connection of the virtual machine to the TCP connection of the virtual machine comprises copying any unread data in a Remote Memory Buffer Element of the RDMA connection to a receive side of a socket;
- migrating the TCP connection from the physical network adapter to a virtual network adapter of the virtual machine; and
- transferring the virtual machine from the source host to the destination host.

16. The computer program product of claim 15, wherein the RDMA connection and the TCP connection are facilitated by a Shared Memory Communications over RDMA (SMC-R) layer.

17. The computer program product of claim 15, wherein the steps further comprise generating, in response to the VM mobility request, the virtual network adapter for the virtual machine.

18. The computer program product of claim 15, wherein the steps further comprise:
- generating the RDMA connection and the TCP connection; and
- maintaining, concurrent to transferring application data via the RDMA connection, the TCP connection using one or more TCP keepalives.

19. The computer program product of claim 15, wherein migrating the TCP connection to the virtual network adapter of the virtual machine comprising removing the physical network adapter from the virtual machine.

20. The computer program product of claim 15, wherein migrating application data transfer from the RDMA connection of the virtual machine to the TCP connection of the virtual machine comprises:
- blocking writes to the RDMA connection;
- moving one or more buffers of a send queue of the RDMA connection to a send queue of the TCP connection;
- copying any unread data in a Remote Memory Buffer Element of the RDMA connection to a receive side of a socket; and
- removing the RDMA connection.

\* \* \* \* \*